United States Patent
Rimboim et al.

(10) Patent No.: US 9,923,727 B2
(45) Date of Patent: Mar. 20, 2018

(54) STANDBY POWERING FOR POWER OVER ETHERNET

(71) Applicant: Microsemi Corp.—Analog Mixed Signal Group, Ltd., Hod Hasharon (IL)

(72) Inventors: Poldi Rimboim, San Jose, CA (US); Lazar Rozenblat, Brooklyn, NY (US); Dennis L Mattocks, Yorba Linda, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 96 days.

(21) Appl. No.: 15/193,121

(22) Filed: Jun. 27, 2016

(65) Prior Publication Data

US 2017/0012788 A1 Jan. 12, 2017

Related U.S. Application Data

(60) Provisional application No. 62/190,268, filed on Jul. 9, 2015.

(51) Int. Cl.
 *H02J 1/00* (2006.01)
 *H02J 3/00* (2006.01)
 *H04B 3/54* (2006.01)
 *H04L 12/10* (2006.01)

(52) U.S. Cl.
 CPC ................... *H04L 12/10* (2013.01)

(58) Field of Classification Search
 CPC ................ H04L 12/00; H04L 12/10
 USPC ............................................... 307/1
 See application file for complete search history.

(56) References Cited

U.S. PATENT DOCUMENTS

| 7,449,796 | B2 | 11/2008 | Elkayam et al. |
| 7,492,059 | B2 | 2/2009 | Peker et al. |
| 7,509,114 | B2 | 3/2009 | Berson et al. |
| 2013/0113275 | A1 | 5/2013 | Dwelley et al. |
| 2013/0257161 | A1 | 10/2013 | Ferentz et al. |
| 2014/0084691 | A1* | 3/2014 | Ranzato .................. H04L 12/10 307/60 |

OTHER PUBLICATIONS

HDBaseT Specification Version 1.1.0, pp. 151-187, published by the HD dated Jul. 12, 2011.
IEEE Std 802.3af-2003—Amendment: Data Terminal Equipment (DTE) Power via Media Dependent Interface; pp. 29-57, 94-96, 102 and 115; Published by the Institute of Electrical and Electronics Engineers, Inc., New York, NY, Jun. 18, 2003.

(Continued)

*Primary Examiner* — Carlos Amaya
(74) *Attorney, Agent, or Firm* — Simon Kahn

(57) ABSTRACT

A respective electronically controlled switch is provided in series with the output of each PD. A control circuit having a timer functionality is further provided, with the electronically controlled switches responsive to the control circuit. Upon detection that a second PD, defined temporally, is provided with operating power, the respective electronically controlled switch is maintained open for a predetermined hold-off time period sufficient to ensure detection by the respective PD control state machine of the completion of startup. After expiration of the predetermined hold-off time period, the respective electronically controlled switch is closed thus enabling normal operation.

6 Claims, 3 Drawing Sheets

(56) References Cited

OTHER PUBLICATIONS

IEEE Std 802.3at-20093—Amendment 3: Data Terminal Equipment (DTE) Power via Media Dependent Interface Enhancements; pp. 22-67; Published by the Institute of Electrical and Electronics Engineers, Inc., New York, NY, Oct. 30, 2009.

* cited by examiner

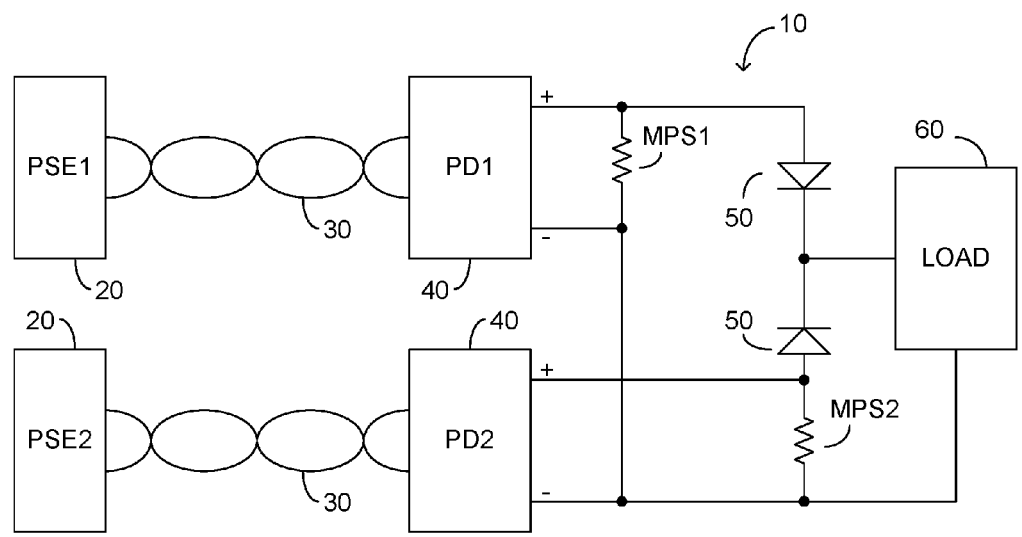
FIG. 1    *PRIOR ART*
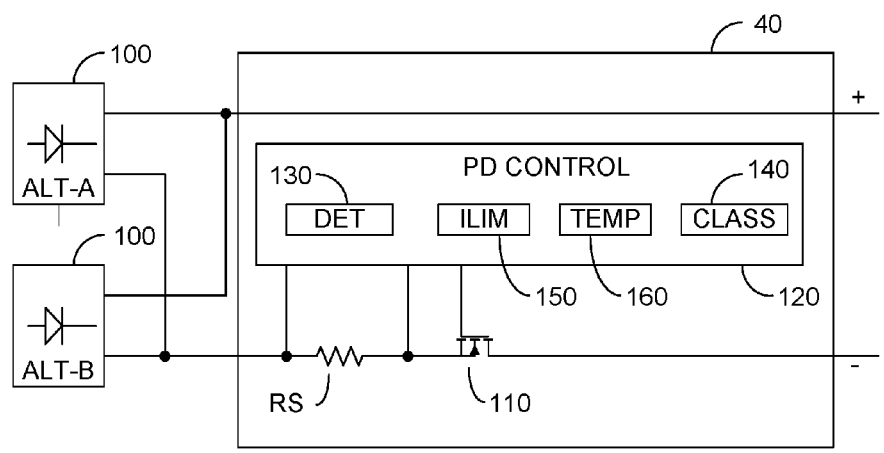
FIG. 2    *PRIOR ART*

STANDBY POWERING FOR POWER OVER ETHERNET

BACKGROUND OF THE INVENTION

The invention relates generally to the field of power over local area networks, particularly Ethernet based networks, and more particularly to a method and apparatus arranged to allow for multiple independent powered device to support a single load.

Power over Ethernet (PoE), in accordance with both IEEE 802.3af-2003 and IEEE 802.3at-2009, each published by the Institute of Electrical and Electronics Engineers, Inc., New York, the entire contents of each of which is incorporated herein by reference, defines delivery of power over a set of 2 twisted wire pairs without disturbing data communication. The aforementioned standards particularly provide for a power sourcing equipment (PSE) and a powered device (PD). The power sourcing equipment is configured to detect the PD by ascertaining a valid signature resistance, and to supply power over the 2 twisted wire pairs only after a valid signature resistance is actually detected.

The HD BaseT Alliance of Beaverton Oreg. has published the HDBaseT Specification Version 1.1.0 which defines a high power standard utilizing twisted wire pair cabling, such as Category 5e (CAT 5e) or Category 6 (CAT 6) structured cabling as defined by ANSI/TIA/EIA-568-A. The specification provides for even higher power than the above mentioned IEEE 802.3at-2009 over each set of 2 pairs, with all 4 pairs utilized for powering, and allows for power over structured communication cabling from any of: a type 1 PSE, denoted hereinafter as a low power PSE, typically meeting the above mentioned IEEE 802.3af standard; a type 2 PSE denoted hereinafter as a medium power PSE, typically meeting the above mentioned IEEE 802.3at standard; a type 3 PSE, denoted hereinafter as a high power PSE, typically meeting the above specification; twin medium power PSEs; and twin high power PSEs.

U.S. Pat. No. 7,509,114 issued Mar. 24, 2009 to Berson et al., the entire contents of which is incorporated herein by reference, is addressed to a redundant powering system. In such a system power is actively supplied to the load by a first PSE, with a second PSE acting in a standby capacity. Both the first PSE and the second PSE area connected to the PD over a single communication cabling.

U.S. Pat. No. 7,449,796 issued Nov. 11, 2008 to Elkayam et al., the entire contents of which is incorporated herein by reference, is addressed to a PoE controller supporting a plurality of modes, where a pair of PSEs may supply power in combination to a single PD, or to independent PDs.

FIG. 1 illustrates a high level block diagram of a PoE powering arrangement 10, according to the prior art, comprising: a first PSE 20, denoted PSE1; a second PSE 20, denoted PSE 2; a first and a second communication cabling 30; a first PD 40, denoted PD1; a second PD 40, denoted PD2; a first and a second ORing diode 50; a first maintain power signature resistor MPS1; a second maintain power signature resistor MPS2; and a load 60. PSE1 is coupled via first communication cabling 30 to PD1 and PSE2 is coupled via second communication cabling 30 to PD2, with each communication cabling typically comprising 4 twisted wire pairs, such as a CAT 5 or CAT 6 cable, as is known to those skilled in the art. In the particular embodiment shown, each PSE 20 is coupled to a respective PD 40 over a particular communication cabling 30, however use of a single communication cabling 30 for coupling a pair of PSE 20 to a pair of PDs 40 may also utilized without exceeding the scope.

The output of each PD 40 is coupled via a respective ORing diode 50 to the positive terminal of load 60, and the return terminal of load 60 is coupled to the return of each PD 40. Thus, the PD 40 exhibit the higher voltage will power load 60, and the PD 40 with a lower voltage will be cut-off by the operation of ORing diodes 50. First and second maintain power signature resistors MPS1, MPS2, respectively, ensure that a sufficient load is presented to each of PD1 and PD2 so as to ensure that the respective PSE 20 does not disable power due to an under load condition. While maintain power signature resistors are shown, this is not to be limiting in any way, and a controlled current source, or toggled resistances may be utilized without exceeding the scope. The input of load 60 typically provides a bulk capacitor, which as will be described further below requires charging under inrush current controlled condition.

FIG. 2 illustrates a high level block diagram of PD 40 and associated input circuitry, according to the prior art, and is available commercially as PD70200 from Microsemi Corp., of Aliso Viejo, Calif. The input circuitry typically comprises a pair of center tapped data transformers, and respective diode bridges, or ideal diode bridges, so as to ensure that PD 40 may receive power under either ALT-A or ALT-B connection, in accordance with the above mentioned standards, irrespective of polarity. For simplicity, the input circuitry is illustrated as respective full wave bridges 100. PD 40 comprises a field effect transistor 110, shown as an NMOS-FET; a sense resistor RS; and a PD control state machine 120. PD control state machine 120 comprises: a detection functionality 130, arranged to provide a predetermined resistance to PSE 20 responsive to a detection voltage; a class functionality 140, arranged to provide a predetermined class current towards the respective PSE 20 in response to a classification voltage; current limit functionality 150 arranged to control NMOSFET 110 so as to ensure that current flow does not exceed certain limits responsive to current flow detected as a voltage drop across sense resistor RS; and a temperature detection functionality 160 to prevent overheating.

In operation, PSE 20 provides an initial detection voltage, typically as a plurality of voltage levels less than 10 V, and upon successful detection of the appropriate resistance of detection functionality 130, presents a classification voltage to PD 40. Optionally, detection functionality 130 is switched out of the circuit responsive to PD control state machine 120 responsive to the detected voltage, which is now in excess of the detection voltage. Class functionality 140 provides a predetermined current flow, whose value may set responsive to an externally measured resistor, so as to identify the power requirement of PD 40 to PSE 20. PSE 20, responsive to a successful detection and optional classification, and if sufficient power is available, then raises the output voltage to an operating voltage, typically in excess of 30 Volts. PD control state machine 120, provides an initial current limit to current limit functionality 150, known as an inrush current limit, denoted $I_{LIM-LOW}$ to prevent a high inrush current upon initial powering due to the charging of any input capacitor at load 60. $I_{LIM-LOW}$ is typically about 240 mA. Upon sensing that the startup has completed, PD control state machine 120, provides an operating current limit functionality 150, higher than $I_{LIM-LOW}$, the higher operating mode current limit denoted $I_{LIM-HIGH}$, which is typically about 450 Ma for low current conditions, and may extend up to 1,800 mA for over current protection. In certain embodiments $I_{LIM-HIGH}$ is set to about 1,100 mA. Other values are also known to those skilled in the art, however the above values are illustrative. In the event of an over temperature condition detected by temperature detection functionality 160, PD control state machine 120 may open NMOSFET 110 to prevent any further flow of current.

The completion of startup is identified by PD control state machine 120 responsive to a reduction in current flow, as sensed across sense resistor RS, to a value below $I_{LIM-LOW}$. Alternately, the voltage drop across NMOSFET 110 is measured, and upon detection that the voltage drop across NMOSFET 110 is below a value indicating that current flow is not restricted by NMOSFET 110, the completion of startup is identified by PD control state machine 120. In one embodiment, a voltage drop of less than 0.7 V across NMOSFET 110 is indicative that startup has completed and PD control state machine 120 thus changes provides operating current limit functionality 150 to $I_{LIM-HIGH}$.

PoE powering arrangement 10 is illustrated as having a pair of PDs 40, however additional powering options may be provided without limitation. For example a mains power adapter may be provided, which preferably is set to output power at a voltage in excess of any expected output voltage from PD1 or PD2, and thus by virtue of a respective ORing diode 50 (not shown) take over powering of load 60 from either PD1 or PD2. In another embodiment a detection circuitry is provided associated with the mains power adapter. Upon detection of active power from such a mains power adapter, power is not drawn from either PD 1 or PD2, however responsive to first and second maintain power signature resistors MPS1, MPS2 both PSE 1 and PSE 2 remain active, i.e. they do not disable power due to an under load condition.

There is one difficulty in PoE powering arrangement 10, which unfortunately prevents its use. For ease of understanding, let us assume that one of the PSEs 20, say PSE1, is supplying power to PD1, at a first voltage level, for example 50 V, and load 60 is drawing 0.5 A. In the event that PSE2 is now enabled at a higher voltage, say 56 V, PD2 will be detected and powered, however PD2 will be unable to detect the end of startup, since it will unable to raise the voltage across load 60 to the higher operating voltage due to the low $I_{LIM-LOW}$, which as indicated above is at about 0.24 A. Thus PD2 will latch in the startup mode and its internal switch may overheat due to continuing operation in linear mode.

What is desired is a solution to the above problem, preferably allowing the use of standard, commercially available PDs.

SUMMARY OF THE INVENTION

Accordingly, it is a principal object of the present invention to overcome at least some of the disadvantages of prior art powering arrangements. This is accomplished in the present embodiments by providing a respective electronically controlled switch in series with the output of each PD so as to prevent the flow of current from the PD via an ORing circuit when opened, and allow the flow of current from the PD via the ORing circuit when closed. A control circuit having a timer functionality is further provided, with the electronically controlled switches responsive to the control circuit. Upon detection that a second PD, defined temporally, is provided with operating power, the respective electronically controlled switch is maintained open for a predetermined hold-off time period sufficient to ensure detection by the respective PD control state machine of the completion of startup. After expiration of the predetermined hold-off time period, the respective electronically controlled switch is closed thus enabling normal operation.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1 illustrates a high level block diagram of a PoE powering arrangement, according to the prior art;

FIG. 2 illustrates a high level block diagram of PD and associated input circuitry, according to the prior art;

DETAILED DESCRIPTION OF THE PREFERRED EMBODIMENTS

Figure 3:
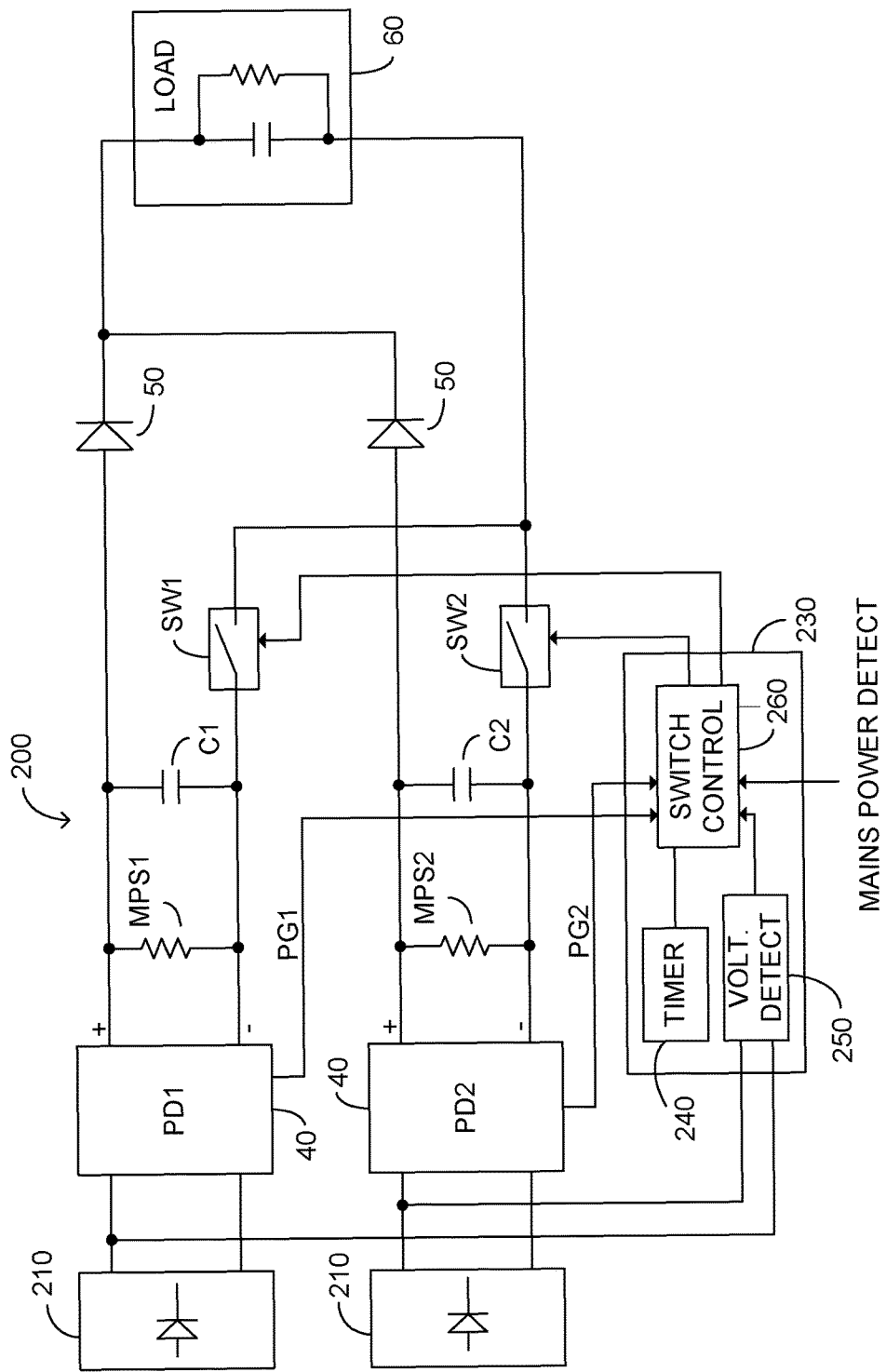
FIG. 3 illustrates a PoE powering arrangement according to certain embodiments.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The invention is being described as an Ethernet based network, with a powered device being connected thereto. It is to be understood that the powered device is preferably an IEEE 802.3 compliant device preferably employing a 10Base-T, 100Base-T or 1000Base-T connection.

FIG. 3 illustrates a PoE powering arrangement 200 according to certain embodiments. As described above in relation to FIG. 2 input circuitry typically comprises a pair of center tapped data transformers, and respective diode bridges, or ideal diode bridges, so as to ensure that PD 40 may receive power under either ALT-A or ALT-B connection, in accordance with the above mentioned standards, irrespective of polarity. For simplicity, the input circuitry is illustrated as a full wave bridge 210, which comprises by of the full wave bridges 100 of FIG. 2. A full wave bridge 210 is supplied as the input circuitry for each of PD1 and PD2.

PoE powering arrangement 200 further comprises: first maintain power signature resistance MPS1; second maintain power signature resistance MPS2; a first capacitor C1; a second capacitor C2; a first electronically controlled switch SW1, which may be implemented as an NMOSFET without limitation; a second electronically controlled switch SW2, which may be implemented as an NMOSFET without limitation; first and a second ORing diodes 50; load 60, illustrated is comprising an equivalent load resistance and input bulk capacitance; and a control circuitry 230 comprising a timer functionality 240, an optional voltage detection functionality 250 and a switch control 260. As known to those skilled in the art, control circuitry 230 may implemented in a state machine, or microcontroller having a timer and an A/D converter, or a direct logic circuit with a timer such as a 555, timer integrated circuit, without limitation. Alternatively, instead of an A/D converter an under voltage lockout circuit may be utilized to detect that the voltage input is indicative of an operating voltage, thus simplifying control circuitry 230. Voltage detection functionality 250 is shown coupled the outputs of each of the full wave bridges 200, however in another embodiment a power good output from the respective PD 40 may be utilized, labelled herein as PG1 and PG2, respectively, and thus voltage detection functionality 250 may not be required as it is then implemented in the respected PDs 40. A single control circuitry 230 is illustrated, it being understood that separate control circuitries 230 may be provided for each PD 40 without exceeding the scope. Capacitors C1 and C2 are optional, and may not be required in some embodiments. Preferably, capacitors C1 and C2 are significantly lower in capacitance than the bulk capacitance present at the input to load 60. Optionally, a mains power detect signal is further supplied to control circuitry 230.

First electronically controlled switch SW1 is arranged in series with the output of PD1, such that when first electronically controlled switch SW1 is open, no current flows from PD1 towards load 60, and when first electronically controlled switch SW1 is closed, current may flow from PD1 towards load 60. As such electronically controlled switch SW1 may be supplied in series with the positive output, or return of PD 1. In one non-limiting embodiment, electronically controlled switch SW1 may be implemented by NMOSFET 110 of PD1, through a control input of PD1 responsive to control circuitry 230.

Second electronically controlled switch SW2 is arranged in series with the output of PD2, such that when first electronically controlled switch SW2 is open, no current flows from PD1 towards load 60, and when second electronically controlled switch SW2 is closed, current may flow from PD2 towards load 60. As such electronically controlled switch SW2 may be supplied in series with the positive output, or return of PD2. In one non-limiting embodiment, electronically controlled switch SW2 may be implemented by NMOSFET 110 of PD2, through a control input of PD2 responsive to control circuitry 230.

The above has been illustrated and described with ORing diodes 50 on the positive leg, and electronically controlled switches SW1 and SW2 on the negative leg, however this is not meant to be limiting in any way. In another embodiment ORing diodes 50 are implemented on the negative leg. In yet another embodiment electronically controlled switches SW1 and SW2 are implemented on the positive leg.

Figure 4:
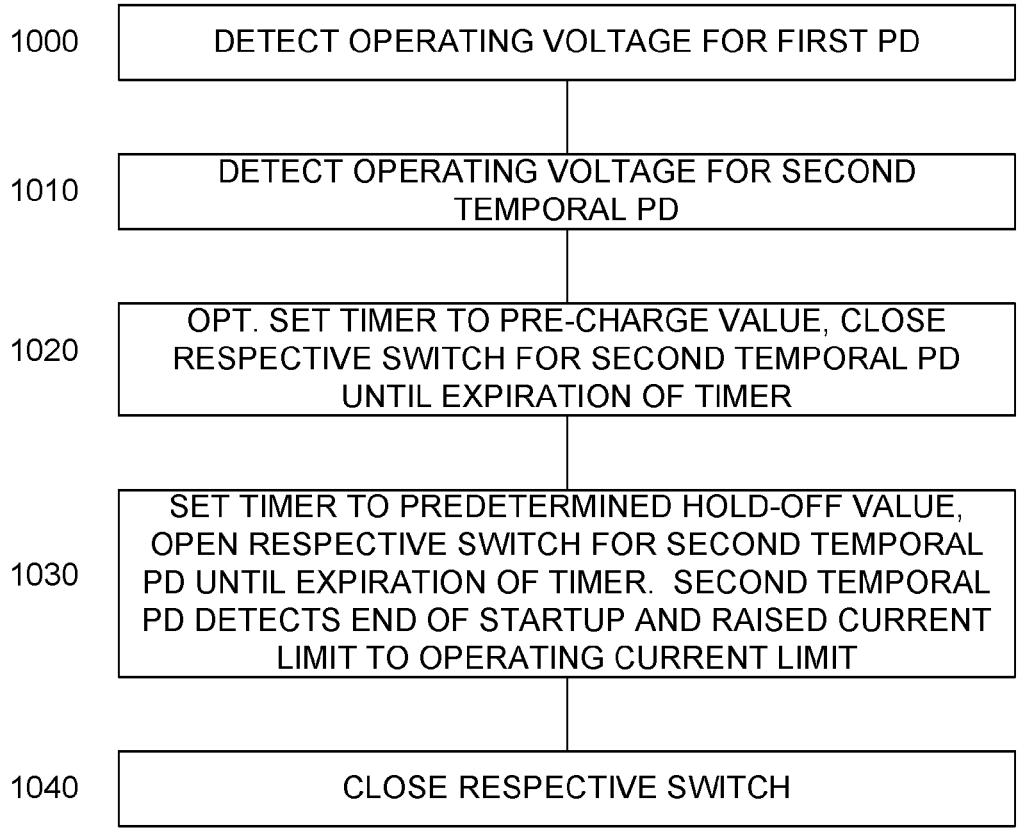
FIG. 4 illustrates a high level flow chart of the operation of the control circuit of the powering arrangement of FIG. 3, according to certain embodiments.

FIG. 4 illustrates a high level flow chart of the operation of control circuitry 230, according to certain embodiments, FIGS. 3 and 4 being described together for clarity. The default setting for each of first electronically controlled switch SW1 and second electronically controlled switch SW2 is closed. In the event that mains power detect signal is supplied and is active, each of first electronically controlled switch SW1 and second electronically controlled switch SW2 are set to be open. In stage 1000 voltage detection functionality 250 detects that operating voltage is received by a particular first PD 40. As indicated above, alternately a power good signal is received from the particular first PD 40. As described above, at startup the respective PD control state machine 120 sets a low current limit, $I_{LIM-LOW}$ to control any inrush current presented by the bulk capacitor of load 60. In stage 1010 voltage detection functionality 250 detects that operating voltage is received by a second PD 40. As indicated above, alternately a power good signal is received from the second PD 40. The term second PD here is meant in a temporal manner, i.e. the second PD 40 to output a valid power good signal or receive operating voltage.

In optional stage 1020, timer functionality 240 is set with a predetermined pre-charge value, for example 70 msec, and the respective electronically controlled switch SW1, SW2 is closed until expiration of the first pre-charge time period. Thus, in the event that operating voltage is first detected for PD2 and then detected for PD1, electronically controlled switch SW1 is closed until expiration of the pre-charge time period. In the event that operating voltage is first detected for PD1 and then detected for PD2, electronically controlled switch SW2 is closed until expiration of the pre-charge time period. The pre-charge time period is arranged to be long enough so that in normal operating conditions the inrush current startup period has ended. In particular, in the event that the second temporal PD 40 has now received operating voltage in excess of the operating voltage of another PD 40 already supplying power to the load, the output voltage of the second temporal PD 40 will begin powering the load as its output voltage reaches the voltage of the previously active other PD 40 and will then hit its inrush current limit, which will slow/stop the increasing voltage level.

In stage 1030, upon expiration of the optional pre-charge time period, or in the event that stage 1120 is not performed responsive to stage 1110, timer functionality 240 is set with a hold-off value, for example 1 msec, and the respective electronically controlled switch SW1, SW2 associated with the second temporal PD 40 is kept open until expiration of the hold-off time period, i.e. until timer functionality 240 indicates expiration of the hold-off value. Thus, in the event that operating voltage was detected in stage 1000 for PD2, and second temporal PD 40 is thus PD1, electronically controlled switch SW1 is maintained opened until expiration of the hold-off time period. In the event that operating voltage was detected in stage 1000 for PD1, and second temporal PD 40 is thus PD2, electronically controlled switch SW2 is maintained opened until expiration of the hold-off time period. The hold-off time period is arranged to be long enough so that irrespective of the state of load 60, i.e. whether it is operating responsive to a lower voltage from the first temporal PD 40, the respective capacitor C1, C2 is charged, and the PD control state machine 120 of the respective second temporal PD 40 detects the end of startup and provides the respective current limit functionality with an operating current limit $I_{LIM-HIGH}$.

In stage 1040, after expiration of the hold-off time period, the respective electronically controlled switch is closed, and remains in that state until operating power is detected as removed from the respective PD 40.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A power over Ethernet powering arrangement comprising:
    a first powered device arranged to receive power over a respective first communication cabling;
    a second powered device arranged to receive power over a respective second communication cabling;
    a load arranged to receive power from each of said first and second powered device;
    a control circuitry;
    a first electronically controlled switch responsive to said control circuitry and associated with said first powered device, said first electronically controlled switch arranged to prevent the flow of current from said first powered device to the load when opened and allow the flow of current from said first powered device to the load when closed; and
    a second electronically controlled switch responsive to said control circuitry and associated with said second powered device, said second electronically controlled switch arranged to prevent the flow of current from said second powered device to the load when opened and allow the flow of current from said second powered device to the load when closed,
    said control circuitry arranged to:
        detect operating voltage for a first temporal one of said first and second powered device;
        detect operating voltage for a second temporal one of said first and second powered device;
        open the associated electronically controlled switch for the second temporal powered device for a predetermined hold-off time; and
        close, responsive to expiration of the predetermined hold-off time, the associated electronically controlled switch for the second temporal powered device.

2. The power over Ethernet powering arrangement according to claim 1, wherein said control circuitry is further arranged to, prior to said opening of the associated electronically controlled switch for the second temporal powered device for the predetermined hold-off time, to:
    close the associated electronically controlled switch for the second temporal powered device for a predetermined pre-charge time period.

3. The power over Ethernet powering arrangement according to claim 1, wherein said load is arranged to receive power from each of said first and second powered device via respective ORing device.

4. The power over Ethernet powering arrangement according to claim 1, wherein said load is arranged to receive power from each of said first and second powered device via respective ORing diode.

5. A method of providing power over Ethernet to a common load from a first and a second powered device, the method comprising:
    detecting operating voltage for a first temporal one of the first and the second powered device;
    detecting operating voltage for a second temporal one of the first and the second powered device;
    preventing the flow of current from the second temporal powered device to the common load for a predetermined hold-off time; and
    allowing the flow of current, responsive to expiration of the predetermined hold-off time, from the second temporal powered device to the common load.

6. The method of claim 5, further comprising, prior to said preventing:
    allowing the flow of current from the second temporal powered device to the common load for a predetermined pre-charge time period.

\* \* \* \* \*